D. L. LINDQUIST & D. C. LARSON.
MOTOR CONTROLLING APPARATUS.
APPLICATION FILED JULY 7, 1914.

1,253,063.

Patented Jan. 8, 1918.
5 SHEETS—SHEET 1.

WITNESSES:
Arthur Tregue Jr.
James G. Bethell

D. L. Lindquist
D. C. Larson
INVENTOR

BY
L. H. Campbell
ATTORNEY

D. L. LINDQUIST & D. C. LARSON.
MOTOR CONTROLLING APPARATUS.
APPLICATION FILED JULY 7, 1914.

1,253,063.

Patented Jan. 8, 1918.
5 SHEETS—SHEET 2.

WITNESSES:
Arthur Trezise Jr.
James G. Bethell

D. L. Lindquist
D. C. Larson
INVENTOR

BY
L. H. Campbell
ATTORNEY

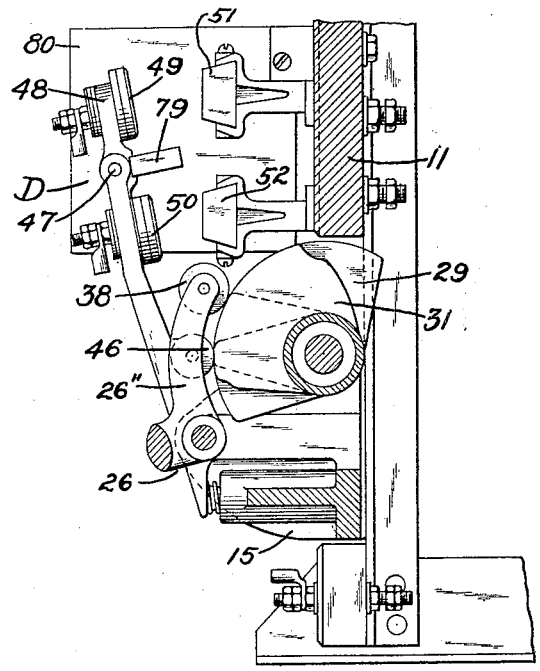
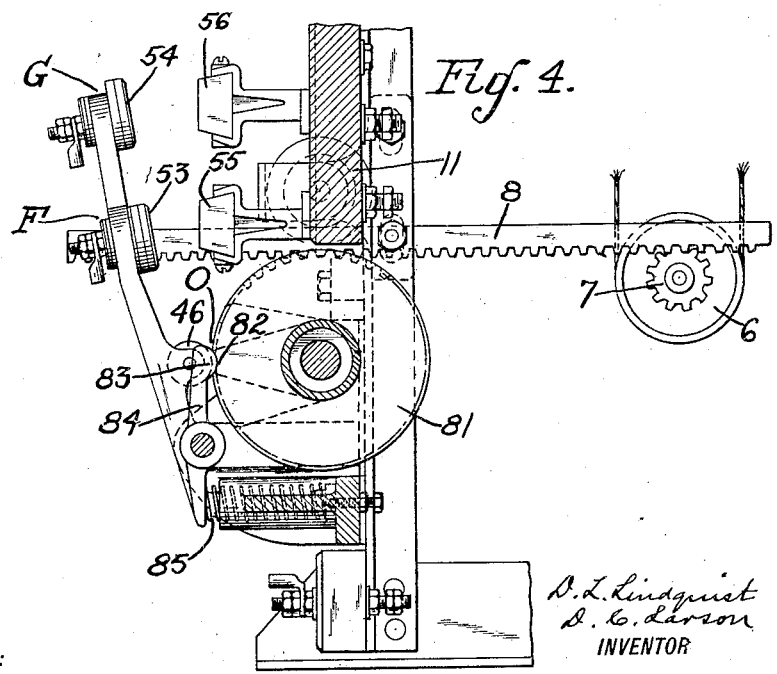

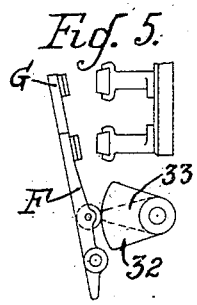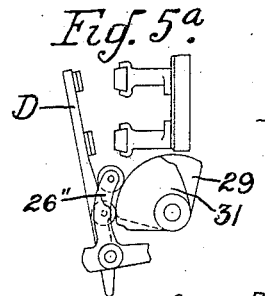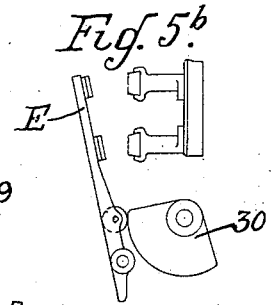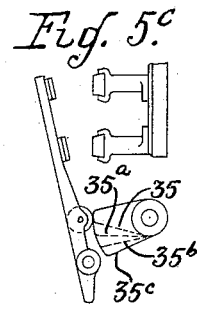
*Centre Position*
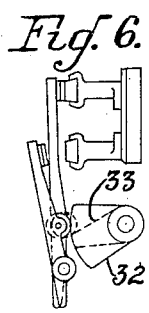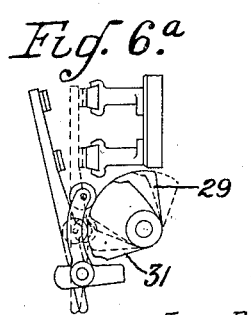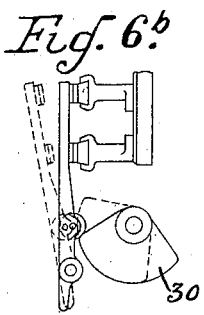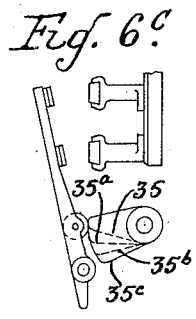
*First Position*
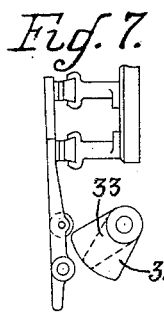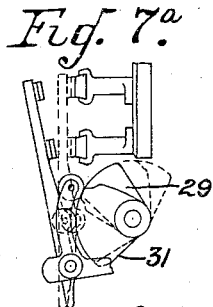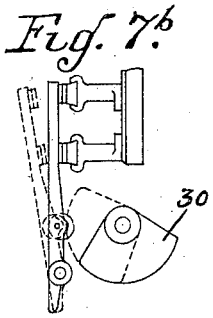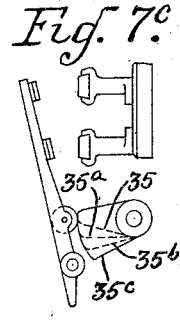
*Second Position*
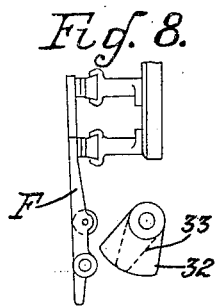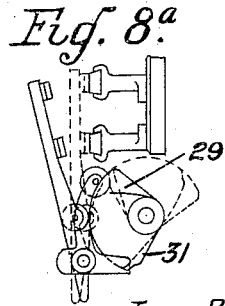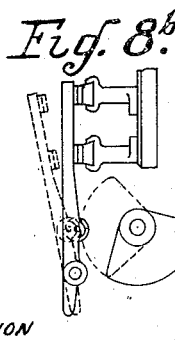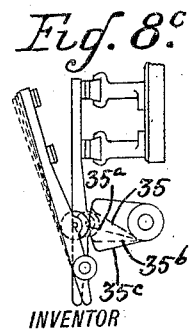
*Third Position*

D. L. LINDQUIST & D. C. LARSON.
MOTOR CONTROLLING APPARATUS.
APPLICATION FILED JULY 7, 1914.

1,253,063.

Patented Jan. 8, 1918.
5 SHEETS—SHEET 5.

INVENTORS
D. L. Lindquist
D. C. Larson

BY
ATTORNEY

WITNESSES:

UNITED STATES PATENT OFFICE.

DAVID L. LINDQUIST AND DAVID C. LARSON, OF YONKERS, NEW YORK, ASSIGNORS TO OTIS ELEVATOR COMPANY, OF JERSEY CITY, NEW JERSEY, A CORPORATION OF NEW JERSEY.

MOTOR-CONTROLLING APPARATUS.

1,253,063.  Specification of Letters Patent.  Patented Jan. 8, 1918.

Application filed July 7, 1914. Serial No. 849,447.

*To all whom it may concern:*

Be it known that we, DAVID L. LINDQUIST, a subject of the King of Sweden, and DAVID C. LARSON, a citizen of the United States, both residing in Yonkers, in the county of Westchester and State of New York, have invented a new and useful Improvement in Motor-Controlling Apparatus, of which the following is a specification.

Our invention relates to motor controlling apparatus, and one of its objects is the provision of improved, simple and efficient means for mechanically operating circuits and connections of such apparatus, the same being an improvement over apparatus for a similar character disclosed in our Patent, No. 967,398, granted August 16, 1910.

Although our invention is particularly adapted to hand rope control alternating current elevators, it may have a general application.

Other objects of the invention will appear hereinafter, the novel combinations of elements being set forth in the appended claims.

Figure 1:
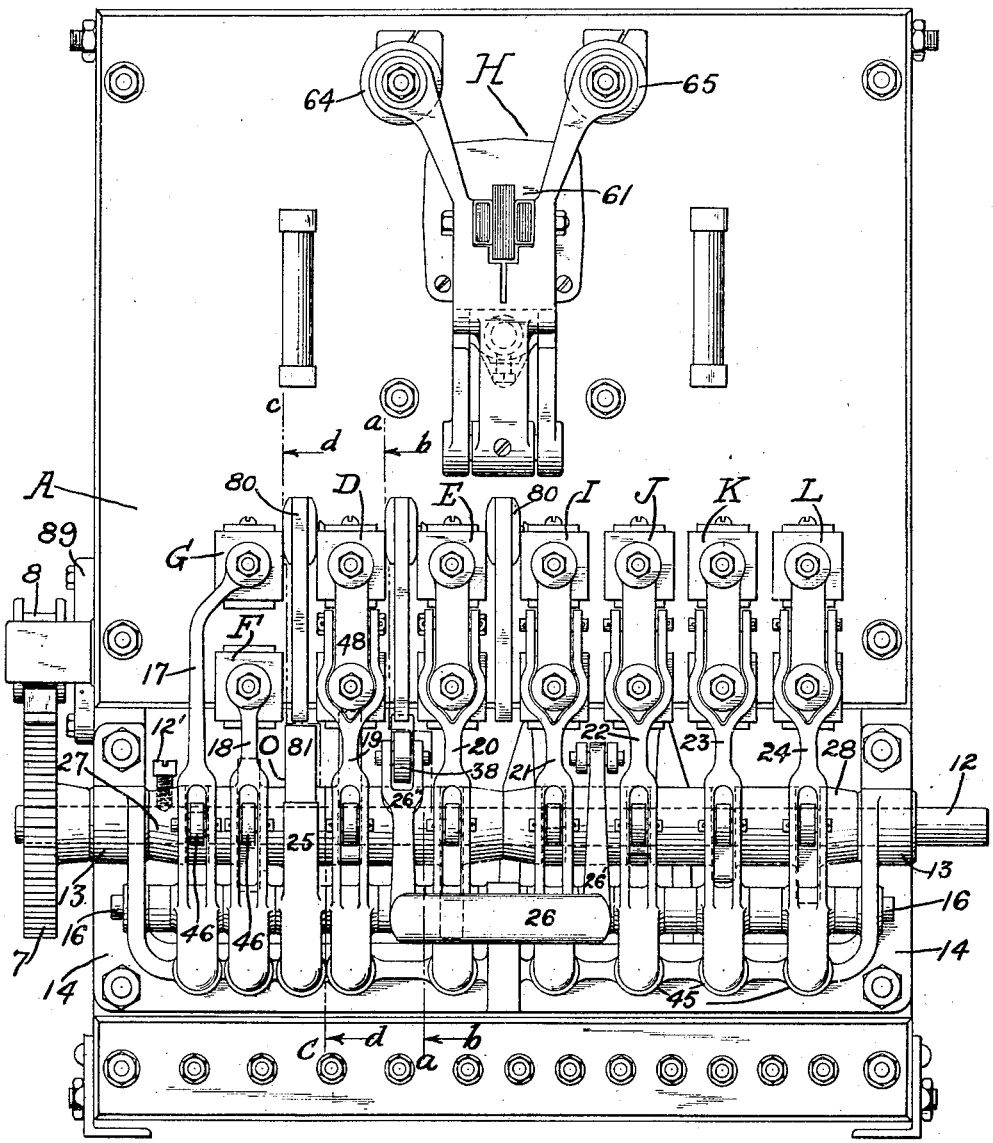
Figure 2:
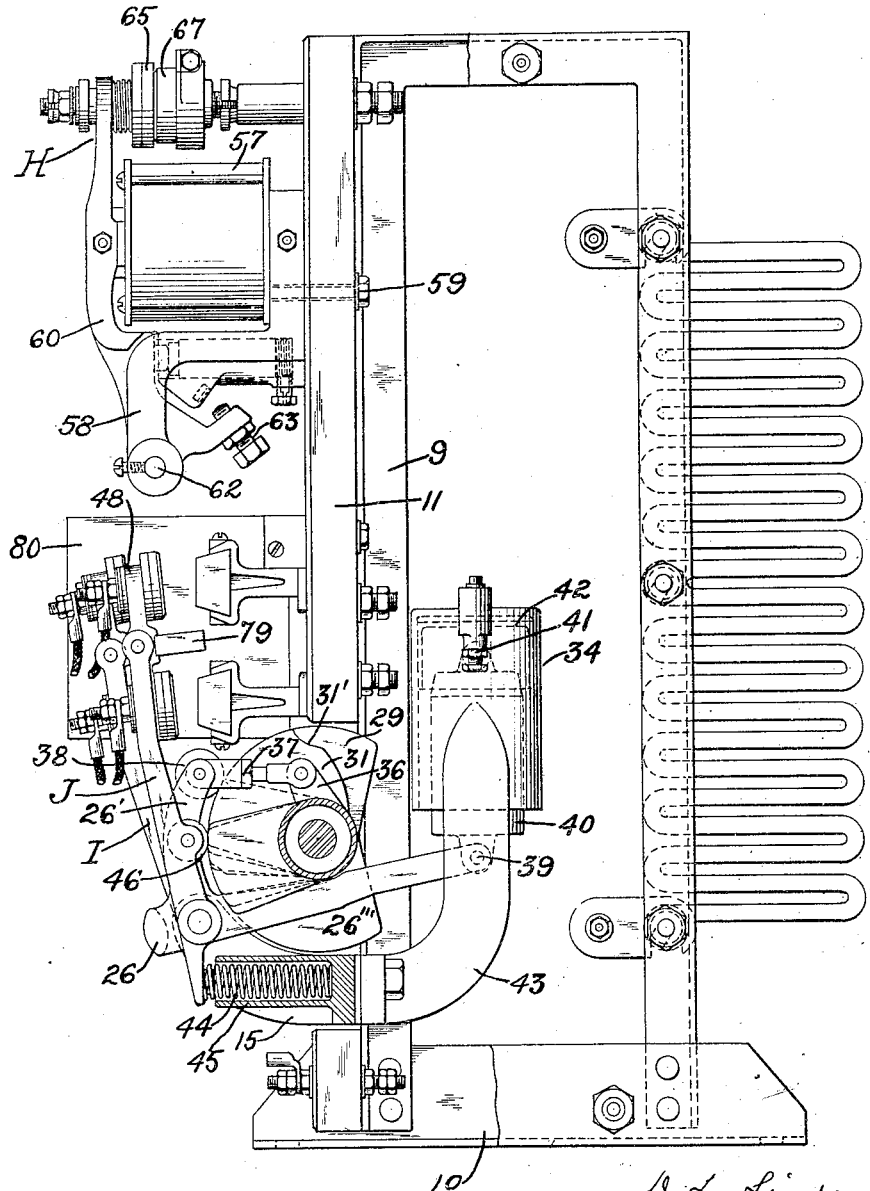
Figure 9:
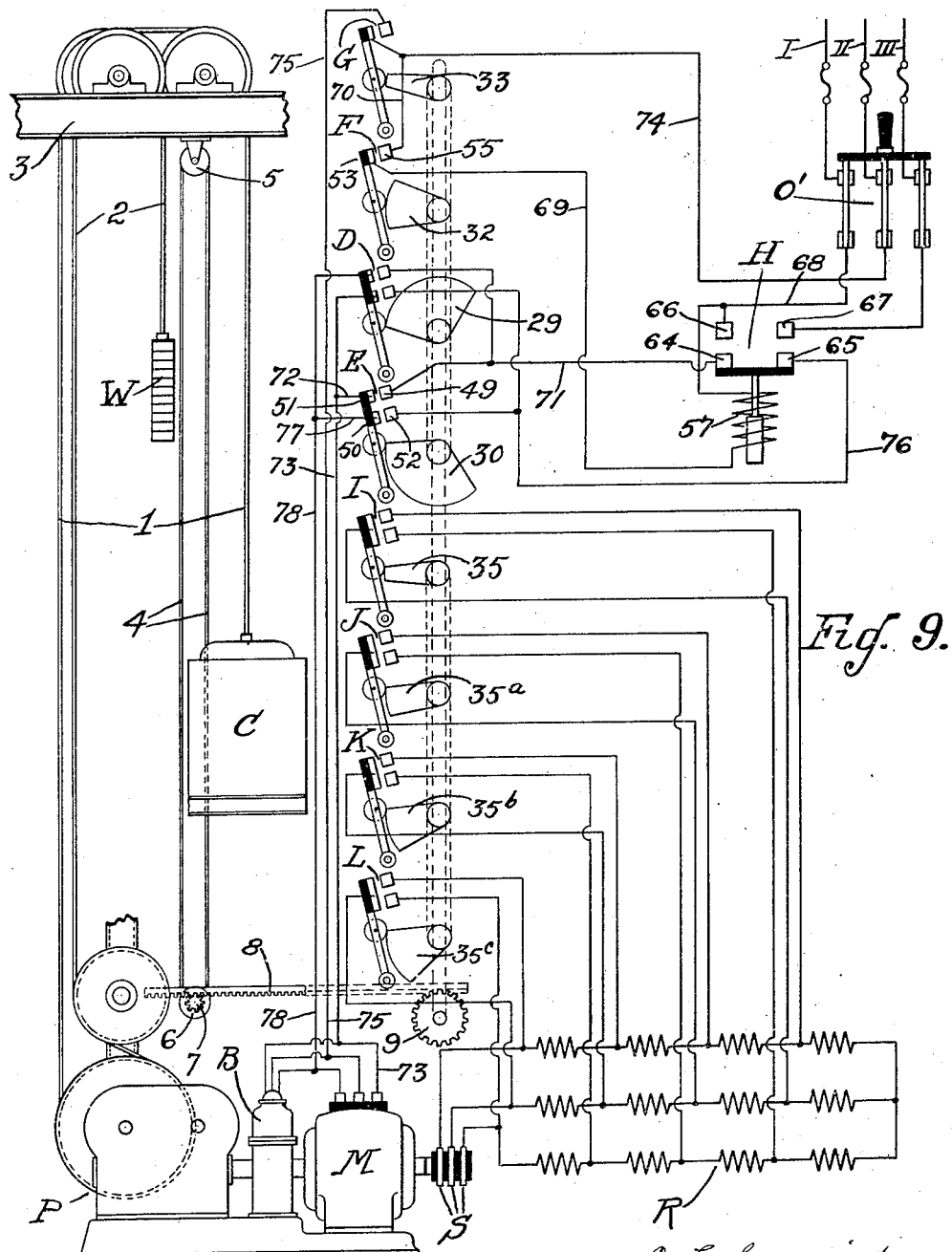

In the accompanying drawings, Figure 1 illustrates a front elevational view of a unitary construction for mechanically operating the reversing switches and accelerating switches of an alternating current or direct current motor; Fig. 2 is a side view of Fig. 1, with certain parts thereof in section; Fig. 3 is a side view of Fig. 1 taken on the line *a—a*, and looking in the direction of the arrows *b—b;* Fig. 4 is a side view of Fig. 1, taken on the line *c—c*, looking in the direction of the arrows *d—d*, and together with a typical hand rope controlled elevator; Figs. 5, 5$^a$, 5$^b$, 5$^c$, 6, 6$^a$, 6$^b$, 6$^c$, 7, 7$^a$, 7$^b$, 7$^c$, and 8, 8$^a$, 8$^b$, 8$^c$, represent in detail the various positions of the separate switches during the operation of the mechanical controller; Fig. 9 represents diagrammatically a hand rope controlled elevator operating by an alternating current motor with our invention applied thereto.

In Fig. 9 a car C is connected by hoisting cables 1 to hoisting apparatus P, which may be connected in the usual manner to an electric motor M, which in this instance is designed to be operated by alternating current. Brake mechanism B may be of any well known type. A counterweight W is connected by cables 2 to the drum of the hoisting apparatus P. Direction sheaves on the overhead fixed beams 3 receive the hoisting and counterweight cables. Extending through the car C is a hand rope 4 which is connected between the sheave 5 mounted on the fixed beam 3, and a shipper sheave 6. A gear wheel 7 is mounted for rotation by the shipper sheave, and is connected by a gear rack 8 to a gear wheel 9 associated with the mechanical controller designated by the reference letter A, which will now be described in detail.

The usual standard or framework 9′ is secured to any suitable base, such as 10, and connected rigidly to this framework is an insulating support 11, preferably of slate. The gear wheel 7 is keyed or may be otherwise suitably secured to a shaft 12, and is journaled in fixed bearings 13, 13, formed integrally with a bracket 14, which is fastened to the framework 9′. Formed integrally with the bracket 14, are a number of laterally projecting arms 15, which support a transverse bearing rod 16. The bearing rod 16 is adapted pivotally to support the switch levers 17, 18, 19, 20, 21, 22, 23, 24, also a member 25, and a three arm bell-crank lever 26. Carried on the shaft 12 are two cam sleeves 27 and 28, the sleeve 27 being fixed to and made rotatable with the said shaft by means of a set screw 12′, and the sleeve 28 being loosely mounted thereon. The sleeve 27 carries the reversing switch cams 29 and 30, the said switch being designated by the reference letters D, E. This sleeve carries also cams 31, 32 and 33, for controlling, respectively, a dashpot 34, an auxiliary switch F and a switch G. Switch F is adapted to control the operation of a main line electromagnetic switch H, and switch G serves to directly connect one of the stator terminals of the motor M with one of the mains of an alternating current supply.

The sleeve 28 carries cams 35, 35$^a$ 35$^b$ and 35$^c$, which are arranged and constructed so as to effect the operation of the accelerating switches I, J, K and L, successively in the order named, to gradually cut out the starting resistance R of an electric motor as hereinafter described. The sleeve 28 carries also an arm 36, which is connected by an adjustable link connection 37 to the arm 26′ of the bell crank 26. The arm 26″ of the bell-crank lever carries at its upper end a roller 38 which coacts with the dashpot cam 31, and the arm 26‴ is pivoted at 39 to a weight 40, which in turn is pivoted at 41 to the dashpot piston 42. Normally the piston 42 is at or near the top of the dashpot cylinder, which is open at its lower end to permit free movement of the weight. The upper end of the dashpot cylinder is provided with means for permitting free egress of the air from above the piston when the latter is moved upwardly, and with automatic means for retarding the movement of the same when moving downwardly, the arrangement being substantially the same as shown in our patent heretofore referred to. The dashpot cylinder is connected to the framework 9, by means of a bracket 43.

The various electric switches will now be described, and as will be noted the reversing switches D, E and the accelerating switches I, J, K, L are all of similar construction. The lower ends of the switch levers engage springs 44, mounted in cups 45, which form an integral part of the bracket 15. These springs normally urge the switch levers to circuit-closing position, but are prevented from doing so by the rollers 46 mounted thereon engaging the respective cams. The upper ends of the levers are bifurcated, and carry pins 47, which pivotally support members 48, to which contacts 49, 50, are secured, and insulated therefrom in the usual manner. The contacts 49 and 50 are adapted to engage contacts 51, 52, respectively, which are mounted on the slate 11. The lower ends of the switch levers F and G are likewise engaged by springs 44, mounted in the cups 45, which springs normally urge the switch levers to circuit closing position, but are prevented from doing so by the roller 46 mounted thereon engaging the cams 32, 33, respectively. The upper end of the switch levers F and G carry contacts 53, 54, respectively, adapted to engage contacts 55, 56, respectively, which are mounted on the slate 11. Arc deflectors 79 are provided on the reversing switches as indicated, and additional deflectors 80 are provided as indicated, the latter deflectors being suitably secured to the slate.

The electromagnetic main line switch H is of the usual construction, and comprises a magnet winding 57, which is suitably secured to the slate 11 by means of a bracket such as 58 and bolts 59. A magnet armature 60 is constructed in the usual manner with laminated poles 61, the armature being pivoted at 62 to the bracket 58, and being adjusted by means of adjusting nuts 63. The armature carries at its upper end, contacts 64, 65, which are adapted to engage contacts 66, 67, respectively, fixed to the slate 11. The switch H is normally open and adapted to be operated to circuit closing position when the magnet winding 57 receives current, the circuit for the said winding being controlled by the switch F. Likewise the other switches are all normally open, and the operation thereof will now be described.

When the hand rope 4 is actuated so as to rotate the shipper sheave 6, motion will be transmitted to the gear wheel 7, which will effect the rotation of the shaft 12 together with the cam sleeve 27 carrying the cams 33, 32, 29, 31 and 30. If it is assumed that the shaft 12 is rotated in a counter-clockwise direction as viewed from the left in Fig. 1, then the said cams will be moved to the position indicated in Figs. 6, 6$^a$, 6$^b$, thus permitting the switch G and the reversing switch E to close. Referring now to Fig. 9, a source of three phase alternating current supply is designated by the reference numerals I, II, III, and O' designates a three-pole switch, and it will be seen that the switch G connects the main II with one of the stator terminals, but the reversing switch E simply closes the circuit for the other two stator terminals from the main line switch H, which as yet is open, as are likewise all the accelerating switches. Further rotation of the shaft 12 moves the said cams into the position indicated in Figs. 7, 7$^a$, 7$^b$, thus the cam 32 permits the switch F to be closed, thereby closing the circuit for the winding 57 of the main line switch H, said circuit being as follows: conductor 68, through the winding 57, conductor 69, switch F, conductor 70, to main II. The main line switch H will now close, and thus connect the motor M with the source of supply, the respective circuits for the stator of the motor being as follows: from the main I, contacts 66 and 64 of the switch H, conductor 71, contacts 49, 51 of switch E, conductors 72, 73, to the stator of the motor. Main II is connected from the switch O to switch G by conductor 74, and from the switch G directly to another stator terminal by conductor 75, and main III, from contacts 67, 65, conductor 76, contacts 52, 50 of the switch E, and conductors 77, 78 to another stator terminal. By reversing the connection of the mains I and III of the motor terminals, the motor may be reversed. This can be accomplished by rotating the shaft 12 in an opposite direction, so that the switch D will be permitted to close automatically by the spring 44, instead of the switch E. The switches F, G and H are operated in the same order or sequence as herein just described, upon the said rotation of the shaft 12 in an opposite direction. It should be here noted that while the sleeve 27 is operated in reverse directions by the shaft 12 to effect the reversal of the motor, the accelerating cam sleeve 28 has only one and the same direction of rotation for effecting the cutting out of the starting resistance, irrespective of the direction of rotation of the cam sleeve 27.

Upon the closing of the switches E and H, it will be seen the motor will receive current so that it may start, the brake apparatus being released when the switch H is closed. The speed of the motor is limited by the starting resistance, which is connected to the rotor or secondary of the motor, through the slip rings S. The sections of the starting resistance are connected to the accelerating switches I, J, K and L, which are respectively controlled by the cams 35, 35$^a$, 35$^b$, and 35$^c$. These cams normally hold the accelerating switches in open position and are so shaped that when the sleeve 28 is rotated they will successively release the said switches to permit the springs 44 to automatically actuate the said switches to circuit closing position.

In Figs. 8, 8$^a$, 8$^b$ and 8$^c$, the position of the various cams are illustrated when the shipper sheave has been moved to a position corresponding to the limit of its intended travel where the roller 38 of the bell crank 26 moves into one of the two recesses 31' on the dashpot cam 31. The dash pot lever 26 will thereupon be released sufficiently to permit the weight 40 to actuate the said bell crank 26 to transmit rotary motion to the cam sleeve 28. This motion is regulated by the dashpot 34, but cannot be varied by changing the speed of rotation of the shipper sheave 6. In Fig. 8$^c$ the cam 35 is shown in a position to which it has been brought by movement of the cam 31 by the action of the weight 40 and its connection to the cam sleeve 28 to free the bell crank lever 26, thus permitting the switch I to close and cut out a section of the starting resistance R. In this manner the sleeve 28 is rotated to effect the cutting out of the remaining steps of starting resistance by the switches J, K and L, due to the release of the same by their associated cams 35$^a$, 35$^b$ and 35$^c$. Obviously the number of steps may be varied as desired, the important advantage being that the switches are operated to closed position without the use of electromagnets and the speed of the successive operation of the last three switches is entirely independent of the operator in the car. Thus it will be seen that the acceleration may be adjusted beforehand, so that danger of the starting resistance being cut out too rapidly may be avoided.

It should be noted that the motor may be operated at slow speed, simply by actuating the hand rope a sufficient distance to move the sleeve 27 to a position as shown in Fig. 7 and stopped in this position, thus effecting the operation of the switches G, E, F and H, and thereby connecting the motor with the source of current supply. If the hand rope is operated continuously and slowly, the motor will receive current an appreciable space of time before the operation of the accelerating switches is permitted.

When the hand rope is moved in the reverse direction to restore the switch apparatus to normal or initial position, positive actuation is transmitted through the cam 31 and the bell crank lever 26 to the accelerating cam sleeve 28. The starting resistance is therefore reinserted, step by step, at a rate depending upon the speed with which the hand rope is moved. The lever 26 may be moved in this manner positively to its initial position without being retarded by the dashpot, as the resistance is almost entirely removed at the check valve past which the air is now permitted to flow freely. The starting resistance being again reinserted the motor will operate at slow speed, while the cams assume the position shown in Figs. 7, 7$^a$, 7$^b$, 7$^c$ and further rotation of the shaft 12 causes the cam 32 to open the switch F, thereby effecting the opening of the main line switch H to cut off the current supply to to the motor and brake. A further rotation of the shaft 12, brings all the cams on the shaft 27 back to their normal position and effects the opening of the reversing switch E and switch G. In order to prevent a too sudden operation of the sleeve 27, which might result in spinning of the same, a braking device is provided, which device is designated by the reference letter O. This device comprises a solid metallic annular member 81 carried by the sleeve 27. The member 81 is provided with a recess 82, which is normally engaged by a head portion such as 83 formed on the member 84. The member 84 is pivotally supported on the rod 16, and at the lower end thereof is an adjustable spring 85 which urges the head 83 into the recess 82. Thus the action of the solid metallic member 81 together with the coacting spring pressed member 84, serves to effectually prevent a too sudden operation of the sleeve 27.

Stop motion mechanism may be used when desired to stop the motor when the car reaches the limits of travel, which mechanism may be substantially the same as shown in our patent heretofore referred to, and not being shown herein, since it forms no particular part of the present invention.

Obviously various changes in the details and arrangement of parts may be made by those skilled in the art without departing from the spirit and scope of our invention, and we desire therefore not to be limited to the precise construction herein disclosed.

We claim:

1. The combination with an electric motor, switch mechanism for controlling the electric motor, a shaft, a cam sleeve connected to the said shaft, cams for operating the said switches, said cams being carried by said sleeve and arranged in the same plane on the sleeve, accelerating switches, an additional sleeve mounted loosely on the said shaft, cams carried by the said additional sleeve for operating the accelerating switches, said cams being arranged in the same plane on the said sleeve, an additional cam carried by the first named sleeve, a connection between the last named sleeve and additional cam, and means for automatically rotating the said loosely mounted sleeve with a retarded movement upon the release of the said connection by the said additional cam.

2. The combination with an electric motor, switches for controlling the starting, stopping and reversal of the motor, a shaft, a sleeve connected to the said shaft, cams arranged in the same plane on one side of the said sleeve for operating the said switches, a connection for actuating the said shaft, accelerating switches, an automatically operated sleeve mounted loosely on the said shaft and carrying cams arranged in the same plane on one side of the sleeve for operating the said accelerating switches, a connection between the said sleeves for preventing rotation of the said loosely mounted sleeve until after the first named cams are operated to a predetermined position, and means for actuating the second named sleeve with a retarded movement to effect the operation of the second named cams to control said accelerating switches.

3. In motor controlling apparatus, the combination with an alternating current motor, a source of alternating current supply, an electromagnetic main line switch, a switch for directly connecting one of the mains with the electric motor, an auxiliary switch for controlling the operation of the main line switch, reversing switch mechanism, and manually controlled cam mechanism arranged to effect the operation of the said switches in predetermined order substantially as described.

4. In motor controlling apparatus, the combination with an alternating current motor, a source of alternating current supply, an electromagnetic main line switch, a switch for directly connecting one of the mains with the motor, an auxiliary switch for controlling the main line switch, reversing switch mechanism, a rock shaft, and cams connected with the said shaft and arranged in the same plane on one side thereof, for effecting the operation of the said switches in a predetermined order substantially as described.

5. In motor controlling apparatus, the combination with an alternating current motor, a source of alternating current supply, an electro-magnetic main line switch, a switch for directly connecting one of the mains with the said motor, an auxiliary switch for controlling the main line switch, reversing switch mechanism, a rock shaft, manually controlled cams connected with the said shaft for effecting the operation of the said switches, one or more accelerating switches, automatically operated mechanism for operating the said switches, and means for preventing the operation of the accelerating switches except in a predetermined order substantially as described.

In testimony whereof, I have signed my name to this specification in the presence of two subscribing witnesses.

DAVID L. LINDQUIST.

Witnesses:
L. M. CAMPBELL,
JAMES G. BETHELL.

In testimony whereof, I have signed my name to this specification in the presence of two subscribing witnesses.

DAVID C. LARSON.

Witnesses:
WALTER C. STRANG,
ERNEST L. GALE, Jr.

Copies of this patent may be obtained for five cents each, by addressing the "Commissioner of Patents, Washington, D. C."